United States Patent [19]
Zrostlik

[11] 3,858,735
[45] Jan. 7, 1975

[54] TIRE MANIPULATING APPARATUS
[75] Inventor: Francis L. Zrostlik, Garner, Iowa
[73] Assignee: Iowa Mold Tooling Co., Inc., Garner, Iowa
[22] Filed: Apr. 16, 1973
[21] Appl. No.: 351,445

[52] U.S. Cl. ............ 214/331, 214/147 G, 214/332, 214/333, 294/86 R, 294/103
[51] Int. Cl. ............................................. B60g 7/00
[58] Field of Search ............ 214/330, 331, 332, 333, 214/334, 1 CM, 652, 653, 654, 147 R, 147 AS, 214/147 G, 731; 294/86 R, 103

[56] References Cited
UNITED STATES PATENTS

| | | | |
|---|---|---|---|
| 2,799,417 | 7/1957 | Morrell | 214/654 |
| 3,008,596 | 11/1961 | Oster | 214/731 |
| 3,231,303 | 1/1966 | Tourneau | 214/147 G |
| 3,235,108 | 2/1966 | Drakulich | 214/731 |
| 3,278,218 | 10/1966 | Lebre | 294/103 R |
| 3,315,542 | 4/1967 | Fortin et al. | 241/1 CM |
| 3,319,813 | 5/1967 | Beyea | 214/147 G |
| 3,493,135 | 2/1970 | Novotny | 214/147 G |
| 3,511,263 | 5/1970 | Emke | 214/653 |
| 3,630,389 | 12/1971 | Schmidt et al. | 214/1 CM |

Primary Examiner—Robert J. Spar
Assistant Examiner—Lawrence J. Oresky
Attorney, Agent, or Firm—Hofgren, Wegner, Allen, Stellman & McCord

[57] ABSTRACT

A tire changing fixture adapted to be mounted on a boom carried by a vehicle for use in changing or repairing extremely large tires of the type frequently weighing several thousand pounds. The fixture includes a jaw assembly having opposed gripping surfaces and motors for moving the surfaces towards and away from each other. The fixture also includes a plurality of pivots in a mounting device for the jaw assembly, the pivots being three in number and defining pivotal axes which are mutually transverse to each other so that the jaw assembly can be capable of substantial universal movement on the end of a boom to which it may be secured. Additional motors are provided for pivoting the jaw assembly about each of the pivot axes.

8 Claims, 7 Drawing Figures

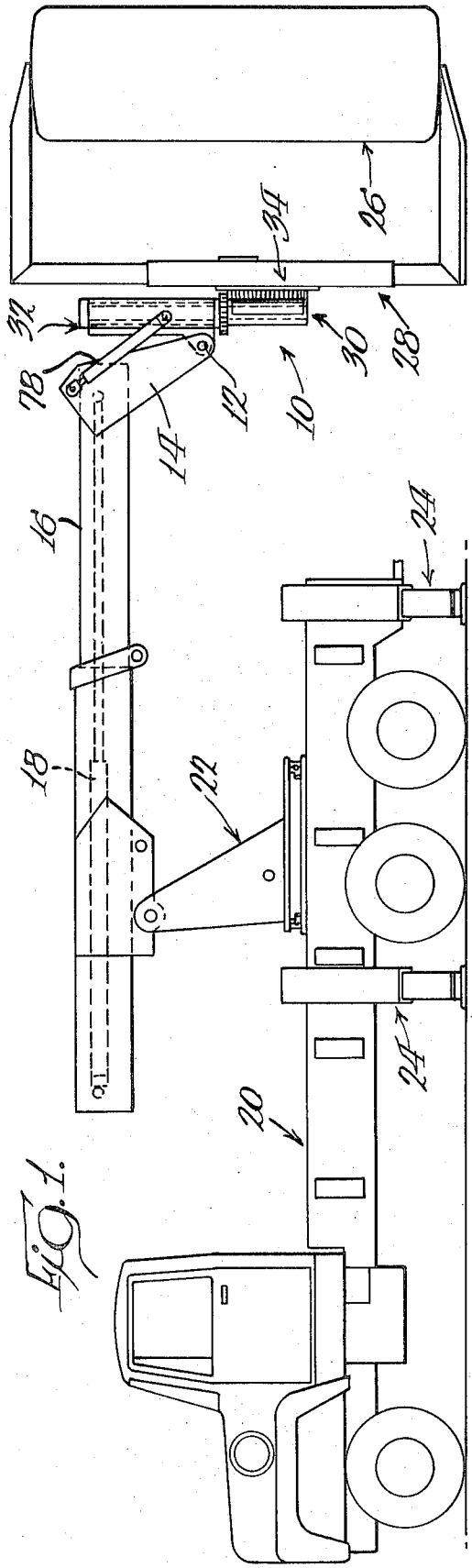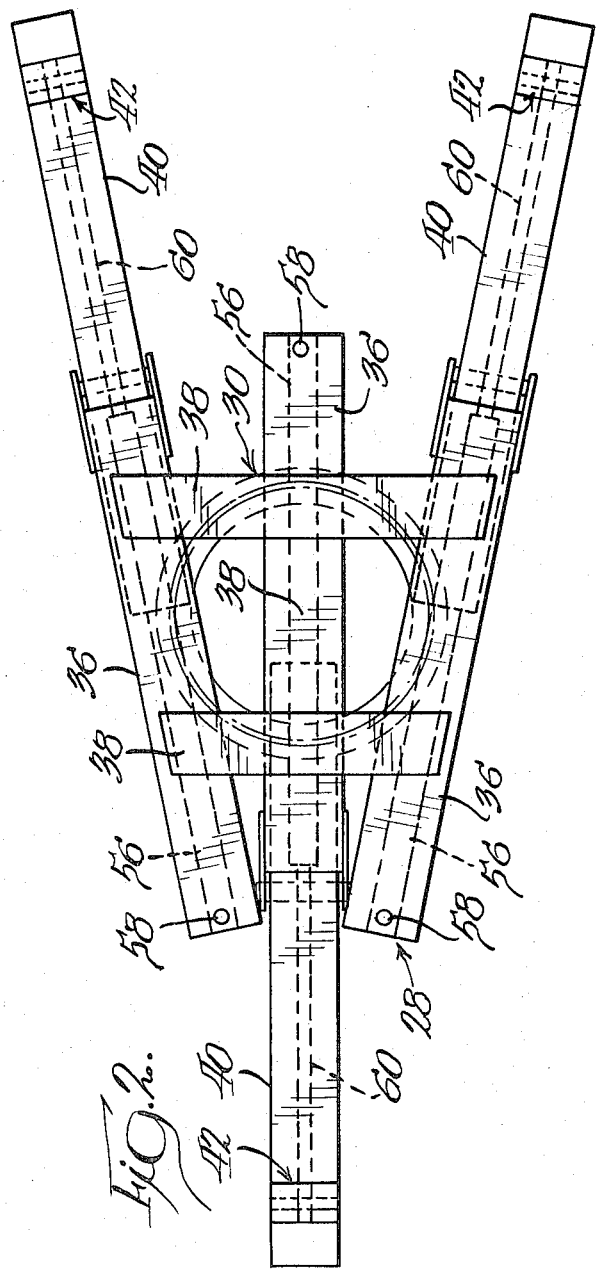

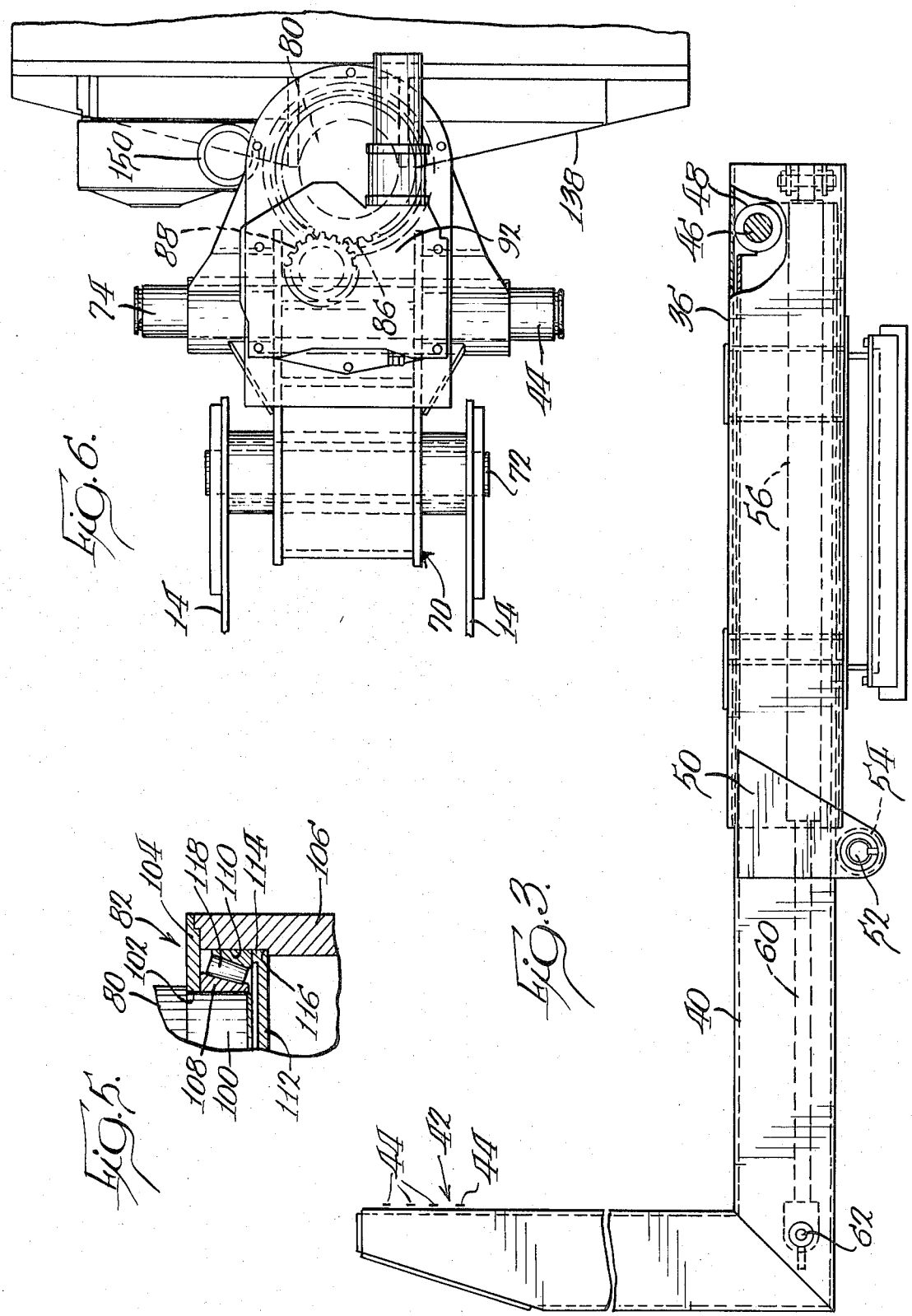

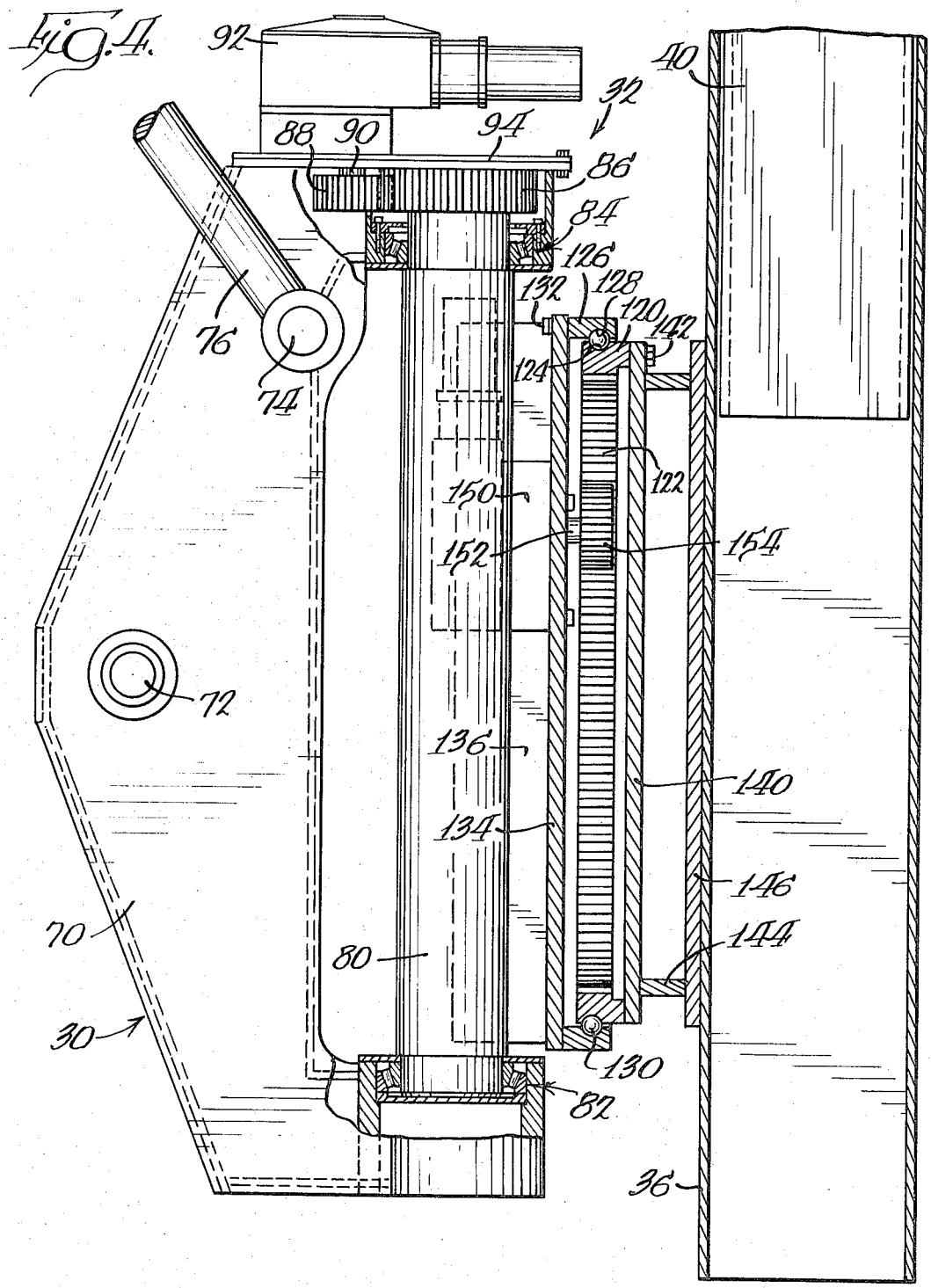

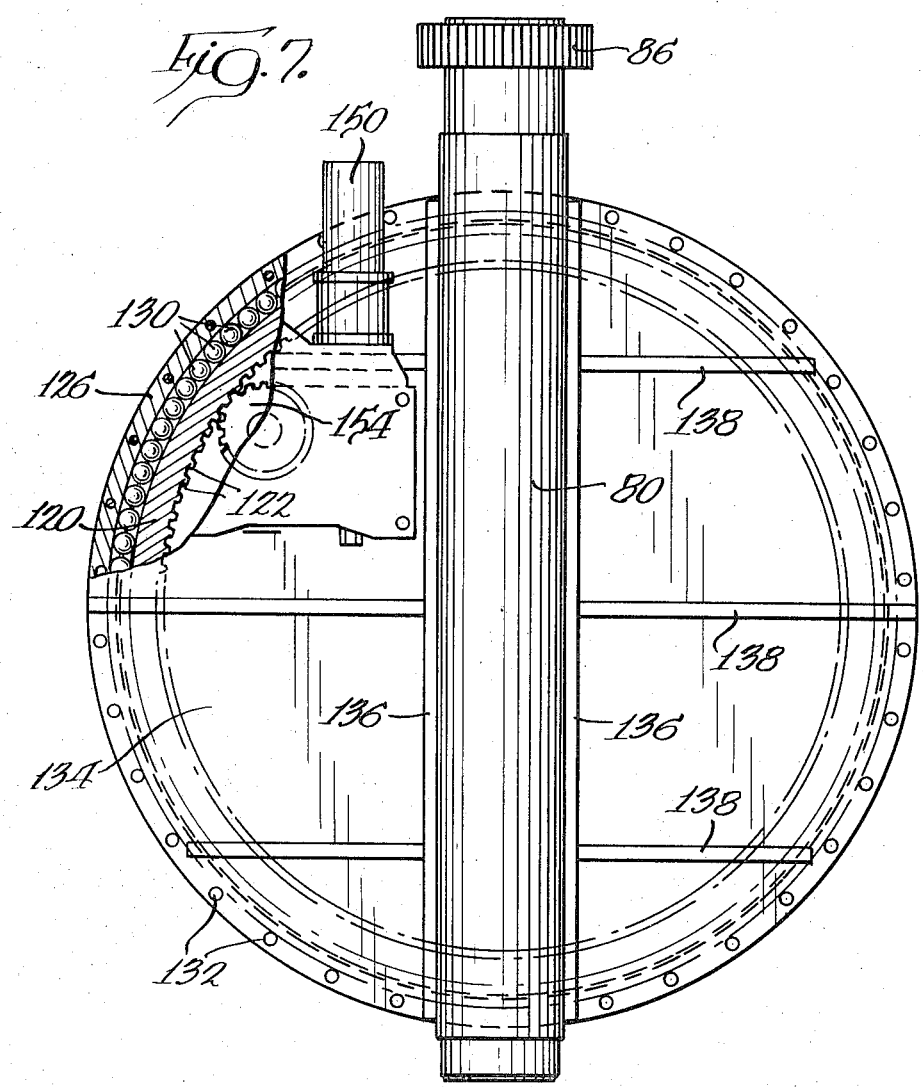

TIRE MANIPULATING APPARATUS

BACKGROUND OF THE INVENTION

This invention relates to tire changing apparatus and, more particularly, to tire changing fixtures for gripping tires of extremely large size and of the type frequently weighing thousands of pounds for removing the same from vehicles and/or manipulating the tires during a changing or repair operation.

Recent years have seen a substantial increase in the size of various off-the-road vehicles of the type generally employed in construction or mining operations as, for example, off-the-road, high-capacity trucks. As the load carrying capacity of such vehicles has been increased, it has also been necessary to increase the size of the tires of such vehicles to provide the capability for carrying increased loads. As a result, there are vehicles in existence which are provided with pneumatic tires having diameters in excess of 10 feet and weighing several thousand pounds.

Such tires, as any other type of tire, require servicing but due to their bulk and weight, a great deal of effort is required. For example, substantial difficulty is encountered in mounting or demounting such tires on the vehicle as well as manipulating such tires during servicing when they are off of the vehicle.

The operation of remounting the tire on the vehicle is perhaps the most difficult of the operations involved in servicing such tires in that the mating securing means on the vehicle axle and on the tire rim must be aligned before the wheel can be secured to the vehicle.

As the size and weight of a tire increases, the alignment requirement becomes substantially more difficult to perform because of the inability to manually correct small errors in alignment.

SUMMARY OF THE INVENTION

It is the principal object of the invention to provide a new and improved tire servicing apparatus. More specifically, it is the object of the invention to provide a tire servicing fixture whereby extremely large and heavy tires may be easily manipulated during all phases of tire changing operations.

The exemplary embodiment of the invention achieves the foregoing object in a construction including a variable width jaw assembly having opposed gripping surfaces which are adapted to be moved towards and away from each other for gripping a tire about the cylindrical periphery of the latter. In a preferred form of the invention, the jaw assembly includes oppositely directed tubes each telescopingly receiving an L-shaped jaw, the bight of which defines the gripping surfaces and is provided with studs to insure a positive grip on the tire.

Hydraulic cylinders are received within the tubes and the L-shaped gripping members and are selectively operable to move the associated L-shaped jaw inwardly or outwardly.

The jaw assembly is secured to a mounting means which is adapted to be secured to the end of a boom that in turn may be mounted on a service vehicle. The mounting means includes a first pivot which is adapted to be connected to the movable boom and a second, parallel pivot spaced therefrom which is adapted to be connected to a hydraulic cylinder which in turn is also connected to the boom. Thus, operation of such a hydraulic cylinder is operative to pivot the jaw assembly about the first pivot axis.

The mounting means also includes a structure defining a second pivot axis for the jaw assembly which is generally transverse to the first pivot axis. In the preferred embodiment, the second pivot axis is provided by a generally vertically arranged shaft which in turn may be rotated by a hydraulic motor and suitable gears. Energization of the hydraulic motor thus provides for pivoting of the jaw assembly about the second axis.

The mounting means further includes a structure defining a third pivot axis which is generally transverse to the first and second pivot axes mentioned above. In the preferred embodiment, the third pivot axis is provided by an internal ring gear received in a circular element which in turn is secured to the shaft for rotation therewith. Bearings are interposed between the circular element and the internal ring gear so as to allow the latter to be easily pivoted. A hydraulic motor having a gear on its output shaft is adapted to rotate the internal ring gear which in turn mounts the jaw assembly which thus provides for pivotal movement of the jaw assembly about the third pivot axis.

By reason of the fact that the three pivot axes are mutually transverse to each other, substantially universal pivotal movement of the jaw assembly is provided whereby, through selective operation of the various hydraulic motors or cylinders, very small increments of movement of the jaw assembly may be easily achieved. Accordingly, when a tire is tightly held within the jaw assembly, small changes in alignment are easy to effect, thereby simplifying a tire mounting operation.

In addition, the same structure provides great degrees of flexibility of movement of the tire held by the jaw assembly during demounting or movement to an appropriate servicing position.

Other objects and advantages will become apparent from the following specification taken in connection with the accompanying drawings.

DESCRIPTION OF THE DRAWINGS

FIG. 1 is a side elevation of a vehicle mounting a boom which in turn mounts a tire servicing fixture made according to the invention;

FIG. 2 is a view of a jaw assembly employed in the tire servicing fixture;

FIG. 3 is an enlarged view of one jaw in the jaw assembly;

FIG. 4 is a side elevation of the mounting means for the jaw assembly with parts broken away for clarity;

FIG. 5 is an enlarged view of a bearing employed in the mounting means;

FIG. 6 is a plan view of the tire servicing fixture; and

FIG. 7 is a rear view of a portion of the mounting means with parts broken away for clarity.

DESCRIPTION OF THE PREFERRED EMBODIMENT

An exemplary embodiment of a tire servicing fixture made according to the invention is illustrated in FIG. 1 and is generally designated 10. By means of a pivot 12, the same is secured to a depending arm 14 on the end of a boom 16 which may be hydraulically extended by means of a conventional, internal, hydraulic cylinder 18.

The boom 16 is mounted on the bed of a service vehicle, generally designated 20 by means of a stand, generally designated 22 which may be conventional in nature in terms of providing for rotation of the boom 16 on the vehicle 20, pivotal movement of the boom 16 about the upper end of the stand 22, etc. Suitable motor means for providing such movement are conventional and will typically be employed.

The vehicle 20 will typically be a heavy-capacity, conventional truck that may be provided with four-wheel drive to enhance its capability for use in remote areas and which may be provided with selectively operable stabilizing jacks, generally designated 24 that may be caused to firmly engage the underlying terrain when the fixture 10 is in use in manipulating an extremely large and heavy tire such as that generally designated 26.

Turning more specifically to the tire servicing fixture 10, and with reference to FIG. 1, the same is seen to include a jaw assembly, generally designated 28, whereby the tire 26 may be firmly held; a mounting means, generally designated 30 to which the jaw assembly 28 is secured and by which the jaw assembly may be secured to the boom 16 through the use of the pivot 12; a means, generally designated 32 defining a second pivot axis for the jaw assembly 28 (the first being that defined by the pivot 12) and generally transverse to the first pivot axis; and a means, generally designated 34, defining a third pivot axis for the jaw assembly 28 which is transverse to both the second pivot axis and the first pivot axis.

Turning now to FIGS. 2 and 3, the jaw assembly 28 will be described in detail. It should be understood that the showing of FIG. 2 illustrates the jaw assembly 28 in but one position of orientation with respect to the third pivot axis defined by the means 34.

A portion of the mounting means 30 mounts three tubes 36 which preferably are of rectangular cross section. At least two of the tubes 36 are generally oppositely extending from the mounting means and preferably, they are arranged so as to extend from the mounting means 30 generally radially from a point 38 which, as will be seen, constitutes the third pivot axis. As seen in FIG. 2, a true radial relationship is only assumed by one of the tubes 36 and as used herein with respect to the tubes 36, the term "generally radial" is intended to encompass some deviation from a true radial relationship of any one or all of the tubes 36, it being desirable, however, that there be some semblance to a true radial relationship.

The tubes 36 are secured to the mounting means 30 in any suitable fashion and on their opposite sides are interconnected by cross plates 38 to rigidify the assemblage. Each of the tubes 36 receives an L-shaped jaw 40 in telescoping relation. As best seen in FIG. 3, each L-shaped jaw member 40 includes, on its bight, a tire engaging surface, generally designated 42, defined by a plurality of inwardly extending studs 44.

The upper end of each L-shaped jaw (that is, the end remote from the bight) journals by means of a shaft 46, a roller 48 which is adapted to bear against one side of the interior of the associated tube 36. The end of the tube 36 nearest the bight of the L-shaped jaw 40 includes a collar 50 which mounts a shaft 52 bearing a roller 54 which is adapted to engage the side of the L-shaped jaw 40 opposite the side thereof mounting the roller 48. In this way, each L-shaped jaw 40 is mounted for relatively frictionless movement into and out of its associated tube 36.

Within each of the tubes 36 and associated L-shaped jaws 40 is a hydraulic cylinder 56. Each cylinder 56 has its end opposite the L-shaped jaw 40 secured as by a pin 58 to the associated tube 36 at the end of the latter opposite the collar 50. The rod 60 of each cylinder 56 is secured as by a pin 62 to the associated jaw 40 adjacent the bight thereof. In each case, the cylinders 56 are double-acting cylinders with the result that when they are operated to extend their respective rods 60, the tire gripping surfaces 42 of the L-shaped jaws 40 are moved away from each other while when the cylinders 56 are operated so as to retract their respective rods 60, the tire gripping surfaces 42 of the L-shaped jaws 40 are moved towards each other so that the same can be clamped about the cylindrical periphery of the tire 26 as illustrated in FIG. 1. Any suitable set of hydraulic controls can be employed in connection with operation of the three cylinders 56.

Turning now to FIG. 4, the mounting means 30 will be described in greater detail. As illustrated, the same includes a shallow, U-shaped housing 70 from which oppositely extending pivot pins 72 (only one of which is shown) extend. The pivot pins 72 provide the pivot 12 for connection to the depending arm 14 of the boom 16. As illustrated, the pivot pins 72 are horizontally oriented and, as will be seen, define a first pivot axis for the jaw assembly 28.

Near the upper end of the U-shaped housing 70, a pair of oppositely extending, horizontally directed pivot pins 74 (only one of which is shown) are provided. The pivot pins 74 provide an additional pivot axis which is parallel to that defined by the pivot pins 72 and are adapted to be pivotally connected to respective rods 76 of hydraulic cylinders 78 (FIG. 1), each having its opposite end pivotally secured to some suitable portion of the boom 16. As a result of the foregoing construction, it will be appreciated that operation of the hydraulic cylinders 78 will cause a pivoting of the jaw assembly 28 about the first pivot axis defined by the pivot pins 74.

FIG. 4 also illustrates the means 32 defining a second pivot axis for the jaw assembly 28. In particular, the ends of the legs of the U-shaped housing 70 journal a generally vertically arranged shaft 80 for rotation about a generally vertical axis. The shaft 80 defines a second pivot axis for the jaw assembly 28, which pivot axis is generally transverse to the first pivot axis defined by the pins 72.

The lower leg of the U-shaped housing 70 includes bearing means, generally designated 82 and a similar set of bearing means, generally designated 84, are provided in the upper leg. An upper extension of the shaft 82 extending above the bearing means 84 mounts a spur gear 86 which is meshed with a spur gear 88 which, in turn, is mounted on the output shaft 90 of a hydraulic motor 92. The hydraulic motor 92 is secured to the U-shaped housing 70 by any suitable means including mounting plates 94. In addition, the housing 70 is suitably dimensioned so as to completely contain the bearings 82 and 84 and the gears 86 and 88 to protect the same from the environment.

FIG. 5 illustrates the lower bearing means 82 in greater detail. Since the construction of the upper bearing means 84 is virtually identical to that of the lower bearing means 82, only the latter will be described.

The lower end of the shaft 80 includes a reduced diameter portion 100 which extends through a circular opening 102 in a plate 104 on the upper surface of the lower leg of the U-shaped housing 70. The plate 104 is secured to a sleeve 106 partially received in the end of the lower leg of the U-shaped housing 70 and defining a subhousing for the lower bearings.

Just below the plate 104, the shaft 80 carries a bearing race 108 while the sleeve 106 carries a second bearing race 110 having an opposed race surface. The latter race is held in place by a disc 112 having an upstanding edge 114 received and held in place on an internal step 116 within the sleeve 106. Roller bearings 118 are interposed between the races 108 and 110.

The means 34 defining the third pivot axis may best be understood with reference to FIGS. 4, 6 and 7. There is provided an internal ring gear 120 having internal gear teeth 122 and an external, peripheral bearing race 124. The internal ring gear 120 is received within a circular bearing race 126 having an internal race surface 128 located in alignment with the race 124 on the exterior of the internal ring gear 120. Between the two races are provided a plurality of ball bearings 130. The bearing race 126 is secured as by bolts 130 to a circular plate 134 which in turn is secured to spaced, vertically oriented plates 136. The latter are secured as by welding to the exterior of the shaft 80 intermediate its ends. As a result, it will be appreciated that the internal ring gear 120 is mounted for pivotal movement about an axis previously referred to as the third pivot axis which is generally transverse to the second pivotal axis defined by the shaft 80 and which is also generally transverse to the first pivot axis defined by the pins 72.

If desired, triangular reinforcing plates 138 may back the plate 134 and interconnect the same with the plates 136 for rigidification purposes.

The internal ring gear 120 also mounts a circular plate 140 which is secured thereto by any suitable means such as bolts 142. The plate 140, in turn, is secured to a short stub sleeve 144 which, in turn, is secured to a mounting plate 146. The latter mounts the tubes 36 of the jaw assembly. As a result of the foregoing interconnection, it will be appreciated that the jaw assembly 28 is mounted for movement about three generally transverse pivot axes which, in turn, mount the jaw assembly 28 for virtual universal movement on the end of the boom 16.

Motor means are also provided for driving the jaw assembly 28 about the third pivot axis defined by the internal ring gear 120. In particular, the plate 134 mounts a hydraulic motor 150 having an output shaft 152 extending through a suitable opening in the plate 134. The output shaft mounts a spur gear 154 which is meshed with the internal ring gear 120. Thus, energization of the hydraulic motor 150 is operative to pivot the jaw assembly 28 about the third pivot axis.

Both the hydraulic motors 92 and 150 are preferably of the reversible type and preferably, both are provided with internal reduction gearing so as to allow the jaw assembly to be moved about the respective axes in small increments to facilitate small changes in alignment during tire mounting.

From the foregoing, it will be appreciated that a tire servicing fixture made according to the invention provides a substantial improvement over such devices heretofore known and use thereof significantly simplifies the manipulation of extremely large diameter tires weighing several thousands of pounds during all phases of servicing operations. For example, small changes in angular alignment during a tire mounting process can be achieved by driving the jaw assembly about its third pivot axis as mentioned previously. Additionally, the third pivot axis provides flexibility in movement of a tire. For example, if the same is carried in an upright condition in the bed of a truck to a site for installation on a vehicle, the jaws may be rotated to generally the configuration illustrated in FIG. 2 with respect to the horizontal, the tire gripped and then the jaw assembly rotated in a clockwise direction approximately 90° prior to aligning the tire with the vehicle to receive the same.

Rotation of the jaw assembly about the first pivot axis allows a tire to be perfectly oriented in a plane transverse to the axis defined by the axle of the vehicle to receive the tire and, in addition, permits the jaw assembly to be moved to a position whereat a tire lying flat on the ground may be gripped by the jaws. The second pivot axis for the jaw assembly also allows the jaw assembly to be oriented to hold a tire in a plane transverse to the axle of a vehicle to receive the same. In addition, the jaw assembly may be rotated about the second pivot axis when the supporting boom for the apparatus is skewed with respect to a vehicle which is to receive a tire or have the same demounted therefrom.

Thus, applicant's invention provides apparatus for handling tires of extremely large sizes and weight with a minimum of effort and one which has the capability of performing virtually all operations associated with tire servicing requiring manipulation of the tire without moving a vehicle mounting the fixture or the like.

I claim:

1. A tire changing fixture adapted to be mounted on a movable boom for use in the repair or changing of extremely large and heavy tires, comprising means defining a variable width jaw assembly having opposed gripping surfaces adapted to be moved toward and away from each other for gripping a tire about its cylindrical periphery;

first motor means connected to said jaw assembly gripping surfaces and selectively operable to move said gripping surfaces toward and away from each other;

mounting means mounting said jaw assembly, said mounting means including a first pivot adapted to be connected to a movable boom so that said jaw assembly may be rotated about a first pivot axis coincident with said first pivot;

means on said mounting means defining a second pivot axis for said jaw assembly generally transverse to said first pivot axis;

said mounting means including means mounting said jaw assembly for pivotal movement about said second pivot axis;

second motor means selectively operable to pivot said jaw assembly about said second pivot axis;

means on said mounting means defining a third pivot axis for said jaw assembly generally transverse to both said first and second pivot axes;

said mounting means including means mounting said jaw assembly for pivotal movement about said third pivot axis; and third motor means selectively operable to pivot said jaw assembly about said third pivot axis whereby said jaw assembly may be mounted for substantially universal movement on a boom to facilitate the gripping and relocating of a tire during a tire changing or repair operation;

said variable width jaw assembly including at least a pair of generally oppositely extending tubular members secured to said mounting means, and at least a pair of L-shaped jaws, one for each of said tubular members and telescopingly received therein, said gripping surfaces being defined by the bights of said L-shaped jaws; and said motor means comprising at least a pair of hydraulic cylinders, one for each of said tubular members, and located within a respective one of said tubular members, each hydraulic cylinder being operatively connected to its tubular members and the associated L-shaped jaw whereby operation of said hydraulic cylinders will move said gripping surfaces toward and away from each other.

2. Apparatus according to claim 1 wherein there are three said tubular members, said tubular members being directed generally radially of one of said second and third pivot axes.

3. Apparatus according to claim 2 wherein the bights of each of said L-shaped jaws are provided with inwardly directed studs for gripping a tire during a tire changing or repair operation.

4. Apparatus according to claim 1 wherein said means defining a second pivot axis includes an elongated, generally vertically arranged shaft journalled for rotation in a portion of said mounting means, said shaft mounting a gear; and said second motor means comprises a hydraulic motor mounted on said mounting means and having a gear on its output shaft, said gears being in meshing engagement.

5. Apparatus according to claim 4 wherein said means defining a third pivot axis is secured to said shaft for rotation therewith.

6. A tire changing fixture adapted to be mounted on a movable boom for use in the repair or changing of extremely large and heavy tires, comprising means defining a variable width jaw assembly having opposed gripping surfaces adapted to be moved toward and away from each other for gripping a tire about its cylinderical periphery;

first motor means connected to said jaw assembly gripping surfaces and selectively operable to move said gripping surfaces toward and away from each other;

mounting means mounting said jaw assembly, said mounting means including a first pivot adapted to be connected to a movable boom so that said jaw assembly may be rotated about a first pivot axis coincident with said first pivot;

means on said mounting means defining a second pivot axis for said jaw assembly generally transverse to said first pivot axis;

said mounting means including means mounting said jaw assembly for pivotal movement about said second pivot axis;

second motor means selectively operable to pivot said jaw assembly about said second pivot axis;

means on said mounting means defining a third pivot axis for said jaw assembly generally transverse to both said first and second pivot axes;

said mounting means including means mounting said jaw assembly for pivotal movement about said third pivot axis; and third motor means selectively operable to pivot said jaw assembly about said third pivot axis whereby said jaw assembly may be mounted for substantially universal movement on a boom to facilitate the gripping and relocating of a tire during a tire changing or repair operation;

said means defining a third pivot axis including an internal ring gear journalled for rotation about said third pivot axis; said jaw assembly being secured to said ring gear, and said third motor means comprises a hydraulic motor secured to said mounting means and having an output shaft bearing a gear in meshing engagement with said internal ring gear.

7. Apparatus according to claim 6 wherein said internal ring gear includes a bearing race extending about its radially outer periphery; and said mounting means comprises a circular member having an internal bearing race; said internal ring gear being received in said circular member; and a plurality of bearings interposed between said circular member and said internal ring gear and engaging both said bearing races.

8. Apparatus according to claim 7 wherein said means defining a second pivot axis includes an elongated, generally vertically arranged shaft journalled for rotation in a portion of said mounting means, said shaft mounting a gear; and said second motor means comprises a hydraulic motor mounted on said mounting means and having a gear on its output shaft, said gears being in meshing engagement; said circular member being secured to said shaft for rotation therewith about said second pivot axis.

* * * * *